(12) United States Patent
Olson et al.

(10) Patent No.: US 6,343,813 B1
(45) Date of Patent: Feb. 5, 2002

(54) IRRIGATION TUBING CONNECTION SYSTEM

(75) Inventors: Donald O. Olson, El Cajon; John Himmelberger, Huntington Beach, both of CA (US)

(73) Assignee: Olson Irrigation Systems, Santee, CA (US)

( * ) Notice: Subject to any disclaimer, the term of this patent is extended or adjusted under 35 U.S.C. 154(b) by 0 days.

(21) Appl. No.: 09/302,534

(22) Filed: Apr. 30, 1999

(51) Int. Cl.[7] ................................................. F16L 37/14
(52) U.S. Cl. ....................................... 285/305; 285/321
(58) Field of Search ................................. 285/305, 421, 285/321; 403/355, 356, 357, 358; 24/16 PB, 17 AP

(56) References Cited

U.S. PATENT DOCUMENTS

| | | | | |
|---|---|---|---|---|
| 1,460,222 A | * | 6/1923 | Benjamin | |
| 2,597,482 A | * | 5/1952 | Harrison et al. | 285/305 |
| 2,623,765 A | * | 12/1952 | Coquille | |
| 3,390,897 A | * | 7/1968 | Moore | 285/421 |
| 3,600,011 A | * | 8/1971 | Alvis | 285/421 |
| 3,606,402 A | * | 9/1971 | Medney | 285/305 |
| 3,759,553 A | * | 9/1973 | Carter | 285/305 |
| 4,281,860 A | * | 8/1981 | Streit | |
| 4,293,148 A | * | 10/1981 | Milberger | 285/305 |
| 4,427,221 A | * | 1/1984 | Shay | 285/305 |
| 4,617,702 A | * | 10/1986 | Diederich | 24/16 PB |
| 4,697,947 A | * | 10/1987 | Bauer et al. | 285/305 |
| 5,813,705 A | * | 9/1998 | Dole | 285/321 |
| 6,179,347 B1 | * | 1/2001 | Dole et al. | 285/321 |

FOREIGN PATENT DOCUMENTS

FR            1310712            10/1962

* cited by examiner

Primary Examiner—Teri Pham Luu
(74) Attorney, Agent, or Firm—J. Mark Holland

(57) ABSTRACT

A spline for joining irrigation tubing includes an elongated body portion. The body is configured to be inserted into and substantially fill a channel formed by aligning an interior channel in a female tubing end and a corresponding exterior channel in a male end. One or more serrations or slots in the body facilitate bending the body into annular channels. The end of the body is tapered to facilitate its insertion, including a taper along its length (such as on the side opposite the serrations), and a gripping portion on the spline further facilitates insertion and removal. Related methods are disclosed.

28 Claims, 3 Drawing Sheets

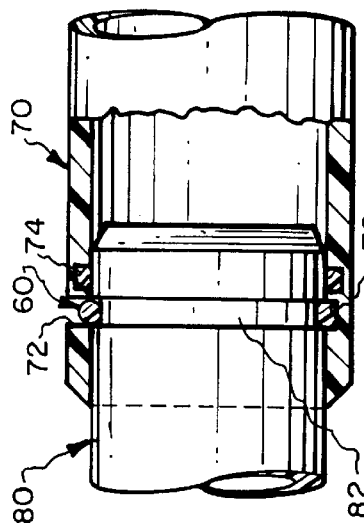
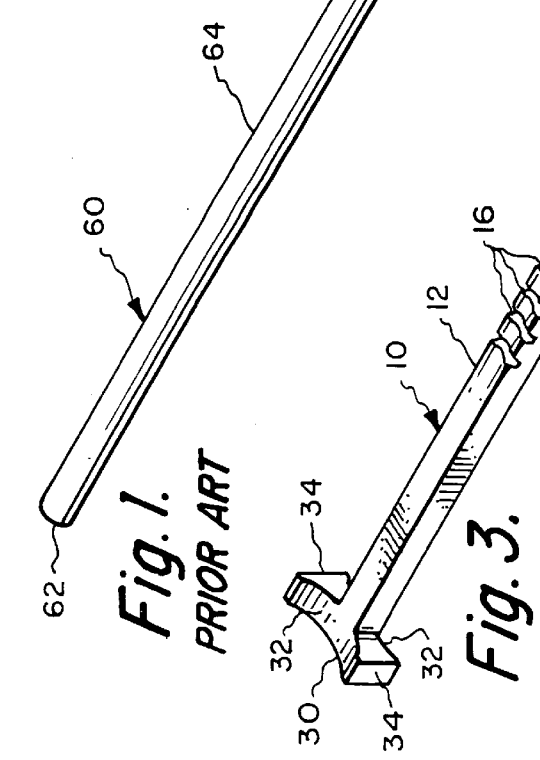
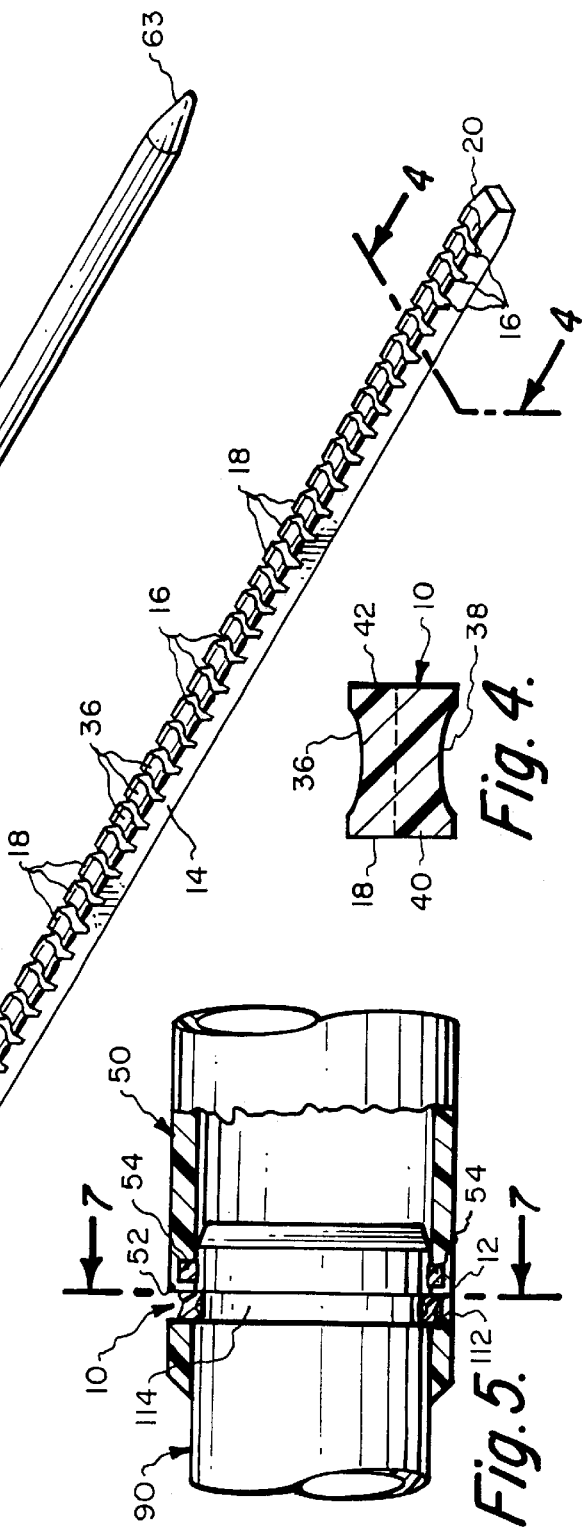

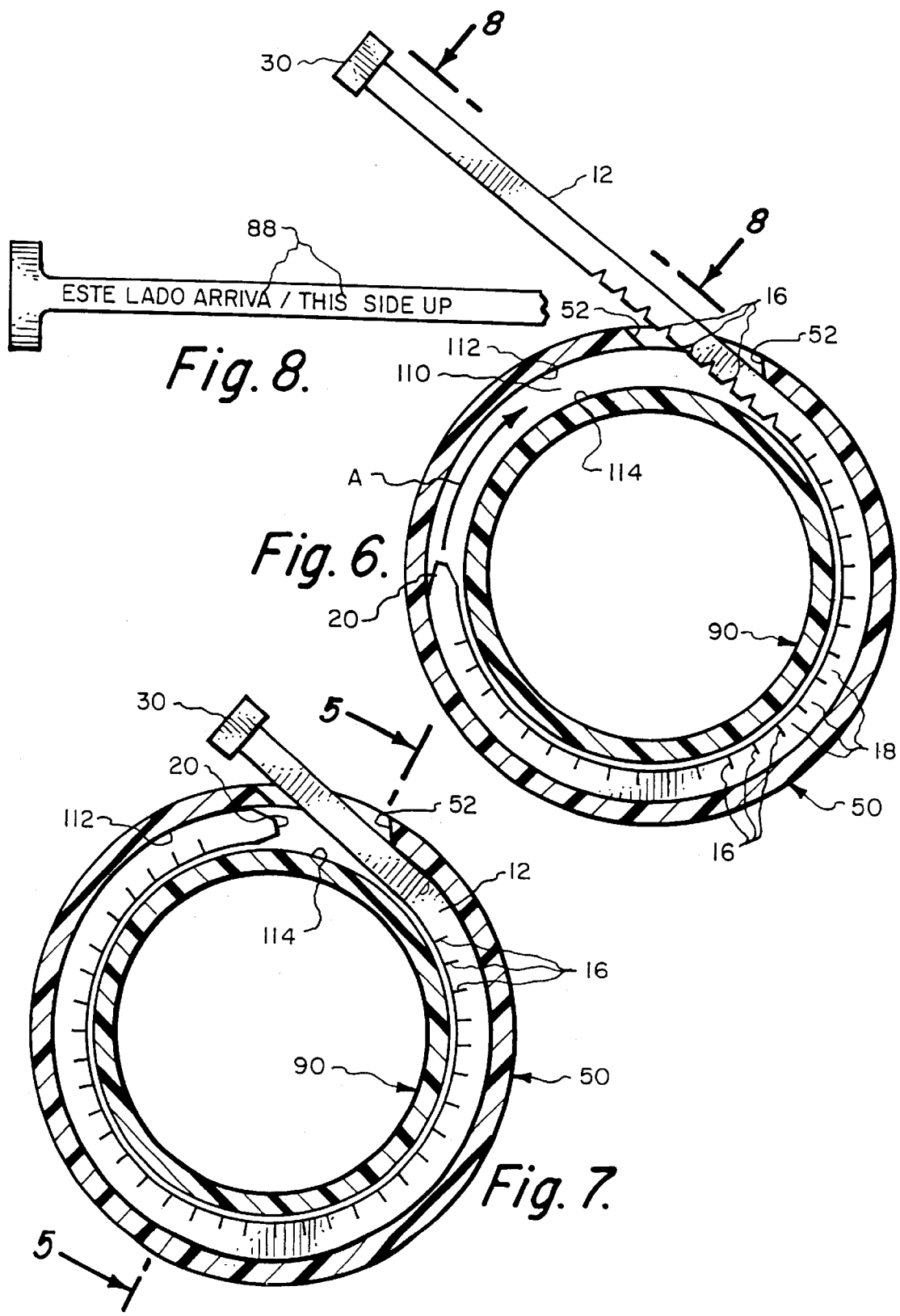

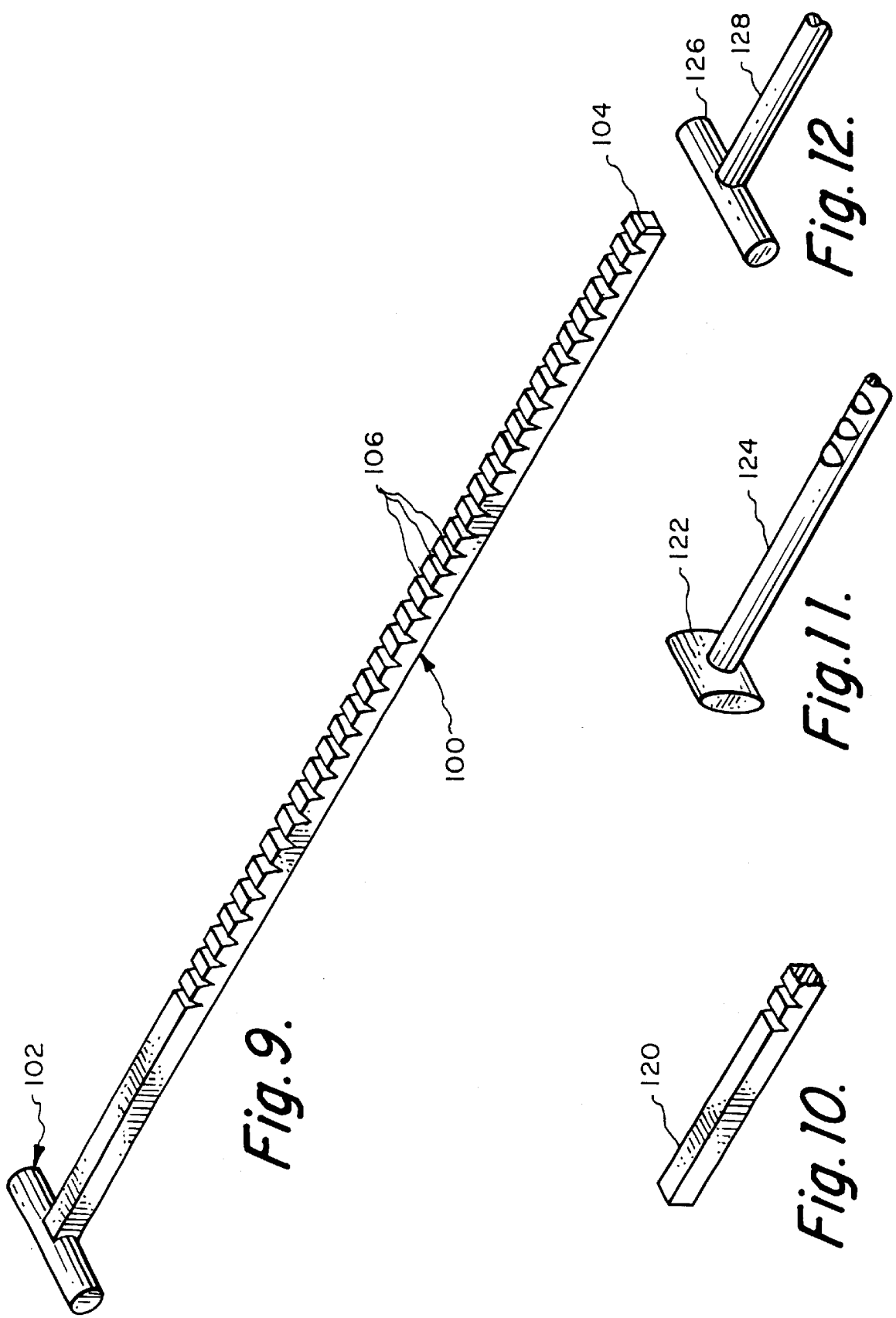

IRRIGATION TUBING CONNECTION SYSTEM

BACKGROUND OF THE INVENTION:

This invention relates generally to tubing connection systems, and specifically to an improved apparatus and method for irrigation systems.

Many systems for irrigating crops or the like involve the assembly of lengths of tubing to each other, to form a network of pipe through which water can flow. In such applications, it is frequently useful and cost-effective to assemble such tubing on a temporary basis, pump water through it, and disassemble and remove it for use in another location or to permit plowing or other intrusive agricultural or similar operations on the soil.

Such systems commonly utilize a plurality of similarly sized and shaped tubing members, each having male and female ends that interfit with each other and permit the ready and efficient assembly of the desired irrigation system. A variety of systems and methods exist to join such members to each other for use.

One such system includes the use of channels on the male and female ends, which can be aligned with each other to form an internal annular space. By inserting an elongated plastic rod into that annular space, the two pieces of tubing can be locked together. Following use, the rod can be removed to permit the tubing to be disassembled. The rod is inserted and removed through an opening in the sidewall of the female end of the tubing, which opening passes from the outside of the assembly to the aligned internal annular space.

Although the aforementioned system permits ready assembly of tubing, the system, and particularly the rods commonly used to lock the tubing pieces to each other, have a number of shortcomings. Among other things, in large-scale agricultural applications, it is important to be able to quickly assemble and/or disassemble the irrigation tubing (so that it can be efficiently placed, moved, and used in large fields). Commonly, the tubing is stacked on truck-beds that are driven or pulled through the field as the tubing or pipe is being deployed. Optimally, the tubing is assembled together at a pace to match the truck's speed, so that a continuous string of pipe "flows" from the rear of the truckbed. The truck simply drives where the pipe is desired, and the assembled tubing is deployed behind the truck and positioned on the ground or otherwise.

Generally, the faster the tubing can be assembled, the more cost effective and time efficient the process becomes. While at any speed the system requires nimble and disciplined workers to ensure that each joint is properly aligned and that the rods are properly inserted (or properly removed during disassembly), the importance of reliable and easy assembly and insertion of the rods becomes greater as speed is increased. Among other things, the energies generated by the various components moving at higher speed increase the degree of any consequent jolts and other damage caused by misassembly, as well as increase the time required to "get back up to speed".

Current rods for such purposes are of relatively basic design and construction. A representative sample is illustrated in FIG. 1, and its assembly with tubing is shown in FIG. 2. Such rods typically have a solid cylindrical body that accomplishes the desired interlocking of tubing members, but has some not insubstantial risk of jamming during insertion into the interior annular space. Among other things, the annular space is typically a rectangular cross section, and during insertion the cylindrical body can inadvertently and undesirably snag or otherwise catch or bind (from friction or otherwise).

Moreover, that risk (and the friction that is a large factor in that risk) increases the further that the rod is inserted into the annular space. Although substantially completely filling the annular space (including completely around the circumference of the joint) would maximize the strength of the tubing engagement, incrementally further inserting the rod typically requires overcoming incrementally greater resistance in the form of having to force the rod (typically a straight member) into a curved space. This forcing has to be accomplished by pushing one end of the rod, and the further "in" the rod goes, the more force is required and the greater the risk of "jamming" the rod.

If such jamming occurs, the workers must risk leaving a less-than-optimal joint between those tubing pieces, or must stop the truck and the assembly process until the rod can be repositioned or otherwise properly inserted. In either case, the quality of the process and result can be compromised.

Cylindrical rods have other drawbacks, including that longitudinal forces acting to push the tubing members away from or towards each other may experience more "give" in the prior art pipe joint than is desirable. Among other things, a round cross-sectioned rod in a rectangular internal annular space in the tubing can permit or encourage the tubing members to roll or extend into and out of engagement to at least some slight degree.

In addition, in many (if not most) applications, the insertion opening can easily become covered with mud or other debris, especially as the assembly lies in a field and is used for irrigation. The mud and debris can make it difficult to locate and/or grasp the rod for removing it during disassembly of the tubing, resulting in similar risks of delay and/or damage as described above. Even without mud or debris (or even simply wetness) as a complicating factor, the typically cylindrical end of the rod can be difficult to grasp and pull in a sufficiently reliable manner to permit efficient disassembly of the irrigation pipe or tubing.

OBJECTS AND ADVANTAGES OF THE INVENTION

It is, therefore, an object of the invention to provide an improved apparatus and methods for assembling tubing to each other, especially for irrigation applications.

The apparatus and methods of the invention are characterized by a retaining member for temporarily connecting two pieces of tubing as described above, in which the retaining member includes an elongated body having one or more serrations or notches along its length. The notches allow the body to bend or flex more readily within the annular cavity formed by the aligned interior and exterior channels of the tubing members.

Another object of the invention is the provision of a retaining member of the aforementioned character, in which the retaining member has a cross-section that approximates the cross-section of the annular cavity formed between the tubing members. For example, in applications in which that cavity has a generally rectangular cross-section, the retaining member likewise has a generally rectangular cross-section of approximately the same dimensions. This helps provide a snug and reliable joint between the tubing members. Among the various modifications of this feature are embodiments in which the surfaces of the retaining member that approximates the cross-section of the annular cavity include at least the surfaces of the retaining member that confront and contact the annular cavity when longitudinal axial forces are applied to the tubing members.

A further object of the invention is the provision of a retaining member of the aforementioned character, in which the retaining member's elongated body includes a first end and a second end, with the first end tapered to facilitate insertion of the end into the cavity formed between the tubing members. The second end can include a gripping portion, which portion can include one or more concave finger grips formed therein.

Yet another object of the invention is the provision of an improved water distribution system that can be readily assembled and/or disassembled. The system includes a plurality of generally rigid tubing members each having a male end and a female end, each of the male ends having an exterior channel formed therein and each of the female ends having an interior channel formed therein, with the female ends configured to matingly receive the male end of an adjacent of the tubing members so that the interior and exterior channels of the respective tubing members are substantially aligned to define an annular bore disposed partially in the male end and partially in the female end. Each of the female ends further includes a passage from the interior channel through the tubing sidewall of the female end. The system includes a plurality of similar elongated strips or splines, each insertable through any of the passages and into the corresponding annular bore, with each of the strips including a plurality of body portions hinged to adjacent such body portions to permit flexing of the strip as it is inserted through the passage and into the annular bore.

An additional object of the invention is to provide a system of the aforementioned character, in which the elongated strips of the system generally approximate the cross-sectional shape and dimensions of the annular bore. The elongated strips include a gripping portion configured to remain outside the passage, and can include one or more concave finger grips formed therein.

Another object of the invention is to provide a method of irrigation, including the steps of providing a first piece of tubing, the first piece having a female end with an annular groove formed in the interior of the female end and spaced therefrom and having a passage from the interior annular groove to an exterior surface of the first piece; providing a second piece of tubing, the second piece having a male end with an annular groove formed in the exterior of the male end and spaced therefrom; inserting the male end into the female end so that the interior and exterior grooves are substantially aligned with each other; providing a spline configured to substantially fill the aligned interior and exterior grooves; and inserting the spline through the passage and into the aligned interior and exterior grooves.

A still further object of the invention is the provision of a method of the aforementioned character, in which the spline includes an elongated body portion, the body portion having a plurality of serrations along its length to provide flexibility to the body portion. The spline can include a grippable head portion and the method can include the further steps of flowing liquid through the assembled first and second pieces of tubing and thereafter removing the spline from the aligned grooves and removing the male end from the female end.

Yet another object of the invention is the provision of a method of the aforementioned character, in which the first piece of tubing includes an opposing male end identical to the male end of the second piece of tubing, and the second piece of tubing includes an opposing female end identical to the female end of the first piece of tubing, and the method includes the steps of providing a plurality of the first and second pieces; providing a plurality of the splines; and assembling the tubing pieces together in an end-to-end manner with adjacent of the tubing pieces by inserting the male ends into adjacent of the female ends and inserting one of the splines at each such interface of male and female ends.

Other objects and advantages of the invention will be apparent from the following specification and the accompanying drawings, which are for the purpose of illustration only.

BRIEF DESCRIPTION OF THE DRAWINGS

FIG. 1 is an orthogonal view of a prior art rod for assembling tubing together;

FIG. 2 is a cross-sectional view of two irrigation tubes assembled and retained together by the prior art rod of FIG. 1;

FIG. 3 is an orthogonal view of a preferred embodiment of the spline or retaining member of the invention;

FIG. 4 is a cross sectional view of the spline of FIG. 3, taken along broken line 4—4 of FIG. 3;

FIG. 5 is a cross sectional view of two irrigation tubes assembled and retained together by the spline of FIG. 3, taken along broken line 5—5 of FIG. 7;

FIG. 6 is a cross sectional view similar to FIG. 5, illustrating the insertion of the spline into the cavity between the tubing members;

FIG. 7 is a cross sectional view similar to FIG. 6, illustrating the spline fully inserted into the cavity between the tubing members;

FIG. 8 is top view of a portion of the spline of FIG. 3, taken along the line 8—8 of FIG. 6 and illustrating preferred marking or engraving on the spline;

FIG. 9 is similar to FIG. 3, but illustrates one of the many alternative embodiments of the spline or retaining member of the invention;

FIG. 10 is also similar to FIG. 3, but illustrates only the left end of another of the many alternative embodiments of the invention, in which no gripping portion or head is provided;

FIG. 11 is similar to FIG. 10, but illustrates yet another of the many alternative embodiments of the invention, in which an alternative gripping portion or head is provided and the extended body portion of the spline is configured with a generally cylindrical cross-section; and FIG. 12 is similar to FIG. 9, but illustrates yet another of the many alternative embodiments of the invention, showing a gripping portions and an extended body portion both having generally circular cross sections.

DESCRIPTION OF PREFERRED EMBODIMENT

FIGS. 1 and 2 illustrate a prior art rod 60 used to assemble tubing members 70 and 80 to each other. As shown in FIG. 1, the rod 60 typically includes a first end 62 that a user typically grasps to manipulate the rod, and an elongated cylindrical body portion 64. Tubing 70 constitutes the female end of a conventional tubing system, which commonly has an opposing male end similar or identical to male end 80. Two adjacent pieces of tubing 70 and 80 are preferably extruded from plastic, but may be formed of metal or some other suitably strong, lightweight material, and are assembled together by inserting the male end 80 into the female end 70. Persons of ordinary skill in the art will understand that the male and female ends 80 and 70 may also be extruded as part of the plastic extrusion processing, and the grooves or channels 76 and 82 discussed below can be machined contemporaneously with the extrusion process.

Those persons will further understand that the male and female ends 80 and 70 also can be formed by any suitable process and material, including without limitation being molded as separate elements and glued, welded or otherwise attached to the ends of straight pieces of tubing.

Also shown in FIG. 2 is a conventional O-ring or gasket 74 to provide a watertight seal between the two tubing members, to permit water or other liquid or gas to flow there-through. The tubing pieces are releasably retained in engagement with each other by inserting the rod 60 through an opening 72 in the side of the female end 70 and into a substantially enclosed channel formed by aligning grooves or channels 76 and 82 formed in the female and male ends 70 and 80, respectively. The first end 62 typically extends some distance out of the opening 72 following assembly, to permit a user to grasp and pull it to remove the rod 60 in connection with disassembling the tubing members from each other. A second end 63 is commonly tapered to approximate a point, facilitating insertion of the rod 60 into the opening 72 and thereafter into further engagement with the tubing members.

The general assembly and function of the prior art system of FIGS. 1 and 2 is similar to that described herein for the invention, but the improvements and benefits of the invention over that shown in FIGS. 1 and 2 will be readily apparent to persons of ordinary skill in the art.

Referring to the drawings, and particularly to FIGS. 3–8 thereof, we show a preferred embodiment of a retaining member 10 such as a spline 12. The spline 12 is preferably fabricated by injection molding, from polypropylene or similar material, but can be fabricated from any suitably strong, flexible material and by any convenient process.

Preferably, the retaining member 10 includes an elongated body portion 14 having one or more serrations or slots 16 formed or cut therein. In the preferred embodiment, these slots 16 define sections 18 flexibly "hinged" to adjacent similar sections 18, the "hinge" being provided by the normal deformability of the remaining material between those sections 18. Those "hinges" preferably are sufficiently thick and/or tough to provide a long service life for repeated flexings during insertion, use, and removal of the spline 12 with the tubing members, as described herein. Consequently, the preferred embodiment has a small, or even negligible, risk of those sections 18 breaking apart from one another while inserted into the assembled tubing. Depending on the location of any such breaks along the spline 12, and depending on the status of the tubing assembly process at the time of the break, it would be at least inconvenient if such a break occurs and a portion of the spline 12 is inside the assembly and not readily removable.

The preferred retaining member 10 further includes a tapered end 20 to facilitate its insertion into the tubing assembly, as described herein. Persons of ordinary skill in the art will understand, however, that many benefits of the invention can be realized without any such taper or tapering, and that the taper can be any of a wide variety of configurations (including being tapered on one, two, or more sides, being a round taper like a pencil point, etc.).

The primary taper illustrated in FIG. 3 is located near the end of the elongated body portion 14 opposite the gripping portion or head 30 (described below), but the preferred embodiment also includes a slight draft or taper (approximately one degree is satisfactory, but other degrees can be readily utilized) along the length of the body portion 14. This draft can be on any one or more sides of the elongated body portion 14, and results in the outer dimensions of the spline 12 gradually increasing from the tapered end 20 to the gripping portion 30. Consequently, the initial insertion distance into the tubing assembly (as discussed herein) encounters even less frictional resistance than would otherwise be the case, and the friction and tightness of fit increases the further the spline 12 is inserted into the tubing. With appropriate design and manufacture, the process of insertion can result in a final "snug" friction fit as the last portion of the spline 12 is inserted.

Additionally, alternative embodiments (not shown, but similar in some ways to FIG. 10, as discussed herein) can include a tapered head 20 on both ends of the elongated body portion 14 (rather than having a gripping portion 30 on one end, as discussed below). Such embodiments can be provided in a reversible form by also providing serrations 16 along the full length of the body portion 14 (from end to end), as well as forming any slight draft or taper (such as the one degree taper discussed above) from the midpoint of the body portion 14 (at its largest) toward each end (where the body portion's cross-section would be its narrowest). Such embodiments permit a user to insert either end into the tubing assembly as described herein, providing an additional ease of use.

Preferably, the retaining member 10 also includes a gripping portion or head 30, having one or more concave finger gripping areas 32 and one or more corresponding extensions 34. Among other things, the extensions 34 are preferably configured to prevent the spline 12 from being inserted too far into the assembled tubing members, by being configured and dimensioned so as not to fit through the insertion opening discussed herein. Persons of ordinary skill in the art will understand that the head 30 can be formed in any convenient configuration, to facilitate the desired manipulation, insertion, removal, and use of the spline 12 in assembling tubing together, as described herein. As explained herein, some of the many alternative embodiments of the head 30 are illustrated in FIGS. 9, 11, and 12, and an embodiment with no head is shown in FIG. 10.

As illustrated in FIG. 4, the cross-section of the preferred embodiment of the spline 12 is generally rectangular. For convenience in molding, as well as to reduce material costs and to help a user readily orient the spline 12 during insertion or other manipulation described herein, the curved surface or surfaces 32 of the head 30 is preferably continued along the length of the spline body 14 in the form or depressions or scooped sections 36 and/or 38. In addition, those curved surfaces 36 and/or 38 can help reduce the contact area between the tubing's interior channel and the spline 12 during insertion, thereby reducing the friction and enabling easier insertion and lowering the force required to insert the spline.

Although the scooped sections 36 and 38 can be specifically designed into the molds for embodiments formed via injection molding, they can also result from normal material shrinkage of parts formed in "straight" molds. Persons of ordinary skill in the art will understand the various benefits of differing mold designs in this regard.

For applications in which the interior annular space in which the spline 12 is to be located to assemble the tubing has flat sides (as discussed herein), the sides 40 and 42 of spline body 14 are preferably correspondingly flat. Persons of ordinary skill in the art will understand that many benefits of the invention can be appreciated with other cross sectional configurations, however, including especially cross sectional configurations that approximate or duplicate the cross section of the inner chamber in which the spline is disposed when assembled with the tubing. Among other things, the closer the abutting surfaces 40 and 42 come to the shape of the inner chamber in which they are disposed, the more firm and secure the joint and the better the load/force distribution will be against longitudinal forces tending to push and pull along the lengthwise axis of the assembled tubing (such as can occur when the tubing is pressurized internally by flowing water or otherwise).

A preferred assembly of the retaining member 10 with tubing members is illustrated in FIGS. 5–7. Many of the elements and functions thereof are similar to that discussed above with respect to prior art FIGS. 1 and 2, but persons of ordinary skill in the art will understand the many benefits of the invention as compared to that prior art system.

Similar to the prior art system of FIGS. 1 and 2, two adjacent pieces of tubing 50 and 90 are preferably formed of plastic, metal, or some suitably strong, lightweight material, and are assembled together by inserting the male end 90 into the female end 50. A conventional O-ring or gasket 54, FIG. 5, is preferably provided to provide a watertight seal between the two tubing members 90 and 50, to permit water or other liquid or gas to flow therethrough in a controlled manner and to reduce or eliminate leakage at the joint.

Persons of ordinary skill in the art will understand that tubing 50 constitutes the female end of a conventional tubing system, and conveniently can have an opposing male end similar or identical to male end 90. The invention is useful in a wide variety of tubing configurations, other than those illustrated in the drawings.

The tubing pieces 50 and 90 are releasably retained in engagement with each other by first inserting the male end 90 into the female end 50 so that the grooves 112 and 114 are substantially aligned to form an annular bore or space 110, FIG. 6. Persons of ordinary skill in the art will understand that the aligned interior and exterior grooves 112 and 114 are preferably formed respectively in the interior of the female tubing end 50 and the exterior of the male tubing end 90.

Next, the spline 12 is preferably inserted through a passage or opening 52 into the aligned interior and exterior grooves 112 and 114, as indicated by the arrow A in FIG. 6 and the final preferred assembled position shown in FIG. 7. Because the spline 12 is configured and dimensioned to be disposed at least partially in each of the grooves 112 and 114, the tubing ends 90 and 50 cannot be pulled apart or pushed together along their lengthwise axis until the spline 12 is removed. The further the spline or retaining member 10 is inserted into the annular bore 110, FIG. 6, the greater the area of interfering contact between the spline 12 and the tubing members upon the application of longitudinal force, and the more secure the joint.

As shown in FIGS. 6 and 7, the handle or gripping portion 30 preferably is positioned adjacent the tubing 90 upon full insertion of the spline 12 into the tubing assembly. To disassemble the tubing members 90 and 50, a user simply grasps the handle or gripping portion 30 and pulls the spline 12 out of the opening 52 (resulting in movement of the spline member 12 in the opposite direction of arrow A, FIG. 6). As compared to prior art systems, the handle 30 permits more ready identification, grasping, and removal of the retaining member from the assembled tubing members in connection with disassembling the system.

The specific shapes, depths and other dimensions and respective proportions of the grooves 112 and 114 can be varied to suit the particular tubing application, but persons of ordinary skill in the art will understand that certain applications (such as agricultural applications discussed above) most benefit from using a plurality of virtually identical tubing members and spline members 12. Many conventional grooves 112 and 114 have a rectangular cross-section, and therefore the spline sides 40 and 42, FIG. 4, will most efficiently abut adjacent surfaces of those grooves if formed substantially flat (as shown in FIG. 4). Persons of ordinary skill in the art will understand that such abutting relationship will maximize the resistance of the spline and the joint to longitudinal axial forces, as discussed herein, and that other groove shapes may be readily utilized with a variety of spline shapes, including spline shapes that approximate the cross-section of any selected groove shape.

Where desired or appropriate, other tubing components (not shown), such as valves, tees, caps, or the like, can be selectively assembled into the tubing system via similar connection mechanisms and processes or otherwise.

Consequently, a custom-tailored system for distributing water or the like can be quickly and reliably assembled on site, and can be readily disassembled and redeployed as desired.

FIG. 8 illustrates a preferred engraving or marking indicia 88 on the spline 12. Although users will quickly understand the proper orientation of the spline 12 (the serrations or slots 16 should face inwardly, toward the inside of the pipe or tubing members 50 and 90), this indicia 88 can be especially useful to a novice assembling the tubing or as a reminder at any time.

Moreover, persons of ordinary skill in the art will understand that certain benefits of the invention (such as easier insertion and improved joint strength as compared to prior art devices) can be derived even if the spline 12 is inserted with the serrations 16 oriented radially outwardly. Although not shown, such an assembly would result from rotating the spline 12 180 degrees about its lengthwise axis from the position illustrated in FIG. 6.

In FIG. 9, one of the many alternative embodiments of the retaining member 10 is shown as an elongated strip 100 having a grippable handle portion 102, a tapered end 104, and grooves or slots 106. Those elements 102, 104, and 106 function similarly to the corresponding structures described above for FIGS. 3–8, and are merely representative of some of the many alternative modifications that can be made to the retaining member 10 of the invention.

FIGS. 10, 11, and 12 illustrate others of the many alternative embodiments of the invention. In FIG. 10, no gripping portion or head is provided. Instead the end 120 is generally the same cross-section as the extended body portion. In FIG. 11, another of the many alternative embodiments of the gripping portion or head is shown as a generally rectangular head 122 having certain rounded edges. Also in FIG. 11, the extended body portion of the spline 124 is illustrated with a generally cylindrical cross-section, one of the many alternative embodiments of the invention. As indicated elsewhere herein, other cross-sectional configurations may be useful for various applications and methods. In FIG. 12, a cylindrical head 126 is provided on a cylindrical body 128. Although FIG. 12 and most of the other drawings show the head generally perpendicular to the extended body portion, persons of ordinary skill in the art will understand that it can be beneficially provided in other orientations as well.

One of the many preferred methods that can be practiced with the invention is agricultural or other irrigation with improved safety and efficiency. Such methods include using a retaining rod or member as described above, and providing a first piece of tubing, the first piece having a female end 50 with an annular groove 112 formed in the interior of the female end and spaced therefrom and having a passage 52 from the interior annular groove 112 to an exterior surface of the first piece. Additional steps include providing a second piece of tubing, the second piece having a male end 90 with an annular groove 114 formed in the exterior of the male end and spaced therefrom, and inserting the male end 90 in the female end 50 so that the interior and exterior grooves 112 and 114 are substantially aligned with each other. Further steps include providing the aforementioned retaining rod or member such as spline 12 configured to substantially fill the aligned interior and exterior grooves 112 and 114, and inserting the spline 12 through the passage 52 and into the aligned interior and exterior grooves 112 and 114.

Steps of the method can also include flowing liquid through the assembled first and second pieces of tubing and thereafter removing the spline 12 from the aligned grooves 112 and 114 and removing the male end 90 from the female end 50. By providing a plurality of the first and second pieces and a plurality of the splines, the tubing can be assembled in an end-to-end manner with adjacent tubing pieces by inserting the male ends into adjacent of the female ends and inserting one of the retaining members 10 or splines 12 at each such interface of male and female ends 90 and 50.

Thus, by our invention we provide an improved apparatus and methods for assembling tubing for applications such as irrigation and the like.

The apparatus and methods of our invention have been described with some particularity, but the specific designs, constructions and steps disclosed are not to be taken as delimiting of the invention in that various obvious modifications will make themselves apparent to those of ordinary skill in the art, all of which will not depart from the essence of the invention and all such changes and modifications are intended to be encompassed within the appended claims.

We claim:

1. A retaining member for temporarily connecting two pieces of tubing in which the first tubing member includes a female end having an opening therethrough and an interior channel aligned with that opening, and the second tubing member includes a male end having an exterior channel alignable with the female end's interior channel when the male end is inserted in the female end, said retaining member including an elongated body, said elongated body configured to be removably inserted through the opening to simultaneously engage the aligned interior and exterior channels and prevent separation of the two pieces of tubing, said retaining member further having a cross-section in which at least one portion of said cross-section is not parallel with a confronting portion of the cross-section of combined interior and exterior channels.

2. The retaining member of claim 1, in which said elongated body includes one or more serrations therein to facilitate bending of said body within the cavity formed by the aligned interior and exterior channels of the tubing members.

3. The retaining member of claim 1, in which said elongated body includes a first end and a second end, said first end being tapered to facilitate insertion of said end into the opening on the first tubing member, and said second end including a gripping portion having one or more concave finger grips formed therein.

4. The retaining member of claim 1, in which said at least one portion of said cross-section not being parallel with the channel cross-section includes a generally concave surface on the surface of said retaining member nearest the center axis of the tubing and a generally concave surface on the surface of said retaining member furthest from the center axis of the tubing.

5. The retaining member of claim 1, wherein said elongated body has a relatively non-collapsible cross-section.

6. A water distribution system, including a plurality of generally rigid tubing members each having a male end and a female end, each of said male ends having an exterior channel formed therein and each of said female ends having an interior channel formed therein, said female ends configured to matingly receive said male end of an adjacent of said tubing members in a generally watertight sealed relationship so that said interior and exterior channels of said respective tubing members are substantially aligned to define an annular bore disposed partially in said male end and partially in said female end, each of said female ends further including a passage from said interior channel through the tubing sidewall of said female end, and a plurality of similar elongated strips each insertable through any of said passages and into the corresponding of said annular bores, each of said strips having at least a portion of its surface shaped to reduce frictional contact with the corresponding annular bore during insertion and removal of said strips into said bore.

7. The water distribution system of claim 6, in which each of said strips includes a plurality of body portions hinged to adjacent such body portions to permit flexing of said strip as it is inserted through said passage and into said annular bore said annular bore has a generally rectangular cross-section and said plurality of body portions each have a generally rectangular cross-section of approximately the same dimensions as that of said annular bore.

8. The water distribution system of claim 6 or claim 7, in which each of said elongated strips includes a gripping portion configured to remain outside said passage.

9. The water distribution system of claim 6, wherein said elongated strips have relatively non-collapsible cross-sections.

10. Apparatus for retaining together two pieces of tubing having an enclosed channel formed therebetween and having an opening from the channel to the exterior of the pieces, said apparatus including an elongated body portion, said body portion including at least one notch therein, said notch positioned to facilitate bending of said body within the enclosed channel, said apparatus further having a cross-section at some position along its length in which at least one portion of said cross-section is not parallel with a confronting portion of the cross-section of the enclosed channel, said at least one portion of said cross-section including a generally concave surface on the surface of said retaining member nearest a center axis of the tubing and a generally concave surface on the surface of said retaining member furthest from the center axis of the tubing.

11. The apparatus of claim 10, in which said elongated body portion has a cross-section that approximates the cross-section of the enclosed channel.

12. The apparatus of claim 10 or claim 11, in which a grippable handle portion is provided at one end of said elongated body portion.

13. The apparatus of claim 10 or claim 11, in which said elongated body portion is tapered from a first end having a smaller cross-section to a second end having a larger cross-section.

14. The apparatus of claim 10, in which said elongated body portion has a relatively solid cross-section.

15. A spline for joining adjacent pieces of tubing to each other, in which said spline includes an elongated body portion, said body portion having a plurality of serrations along its length to provide flexibility to said body portion and at least one concave surface, said spline being formed as a monolithic injection molded element having an integral head at one end with concave finger-grip portions formed therein.

16. The spline of claim 15, in which said body portion has a generally rectangular cross-section.

17. The spline of claim 15, in which said spline has a cross-section that is generally without any central cavity.

18. A method of irrigation, including the steps of:
providing a first piece of tubing, said first piece having a female end with an annular groove formed in the interior of said female end and spaced therefrom and having a passage from said interior annular groove to an exterior surface of said first piece;
providing a second piece of tubing, said second piece having a male end with an annular groove formed in the exterior of said male end and spaced therefrom;
inserting said male end in said female end so that said interior and exterior grooves are substantially aligned with each other and that the first and second tubing pieces are in a generally watertight sealed relationship with each other;
providing a spline configured to substantially fill said aligned interior and exterior grooves, said spline being a monolithic injection molded element having an integral head at one end that is larger than the cross-section of the aligned interior and exterior grooves, and an elongated body with at least one non-parallel surface, said integral head configured to not be insertable into the aligned interior and exterior grooves; and
inserting said spline through said passage and into said aligned interior and exterior grooves.

19. The method of claim 18, in which said spline includes an elongated body portion, said body portion having a plurality of serrations along its length to provide flexibility to said body portion.

20. The method of claim 18 or claim 19, in which said spline includes a grippable head portion and said method includes the steps of flowing liquid through said assembled first and second pieces of tubing and thereafter removing said spline from said aligned grooves and removing said male end from said female end.

21. The method of claim 18 or claim 19, in which said first piece of tubing includes an opposing male end identical to said male end of said second piece of tubing, and said second piece of tubing includes an opposing female end identical to said female end of said first piece of tubing.

22. The method of claim 21, including the steps of:
providing a plurality of said first and second pieces;
providing a plurality of said splines; and
assembling said tubing pieces together in an end-to-end manner with adjacent of said tubing pieces by inserting said male ends into adjacent of said female ends and inserting one of said splines at each such interface of male and female ends.

23. The method of claim 19, in which said elongated body portion includes first and second ends configured to be reversibly usable, in that either of said ends may be inserted through said passage and into said aligned interior and exterior grooves.

24. The method of claim 18, further providing one or more serrations on said spline.

25. A retaining member for temporarily connecting two pieces of tubing in which the first tubing member includes a female end having an opening there through and an interior channel aligned with that opening, and the second tubing member includes a male end having an exterior channel alignable with the female end's interior channel when the male end is inserted in the female end, said retaining member including an elongated body, said elongated body configured to be removably inserted through the opening to simultaneously engage the aligned interior and exterior channels and prevent separation of the two pieces of tubing, said retaining member being formed as a monolithic injection molded element having an integral head at one end having a larger than the opening into the interior channel so that said integral head is not insertable into the assembled tubing channel.

26. The retaining member of claim 25, said retaining member further having a cross-section in which at least one portion of said cross-section is not parallel with a confronting portion of the cross-section of combined interior and exterior channels, said at least one portion of said cross-section including a generally concave surface on the surface of said retaining member nearest the center axis of the tubing and a generally concave surface on the surface of said retaining member furthest from the center axis of the tubing.

27. The retaining member of claim 1 or claim 2 or claim 3 or claim 4 or claim 25 or claim 26, in which said elongated body is tapered from a first end having a smaller cross-section to a second end having a larger cross-section.

28. The retaining member of claim 25, wherein said elongated body has relatively non-collapsible surfaces and wherein at least one of said surfaces includes a plurality of serrations therein.

* * * * *

UNITED STATES PATENT AND TRADEMARK OFFICE
CERTIFICATE OF CORRECTION

PATENT NO. : 6,343,813 B1
DATED : February 5, 2002
INVENTOR(S) : Donald O. Olson and John Himmelberger It is certified that error appears in the above-identified patent and that said Letters Patent is hereby corrected as shown below:

<u>Column 10,</u>
Lines 30-31, "bore said annular" should read -- bore, and said annular --.

Signed and Sealed this

Twenty-third Day of July, 2002

Attest:

Attesting Officer

JAMES E. ROGAN
*Director of the United States Patent and Trademark Office*